(No Model.)
J. CLIFFORD & J. H. GAVIN.
WASTE AND OVERFLOW CONNECTION FOR CEMENT LAUNDRY TUBS.
No. 480,692. Patented Aug. 9, 1892.
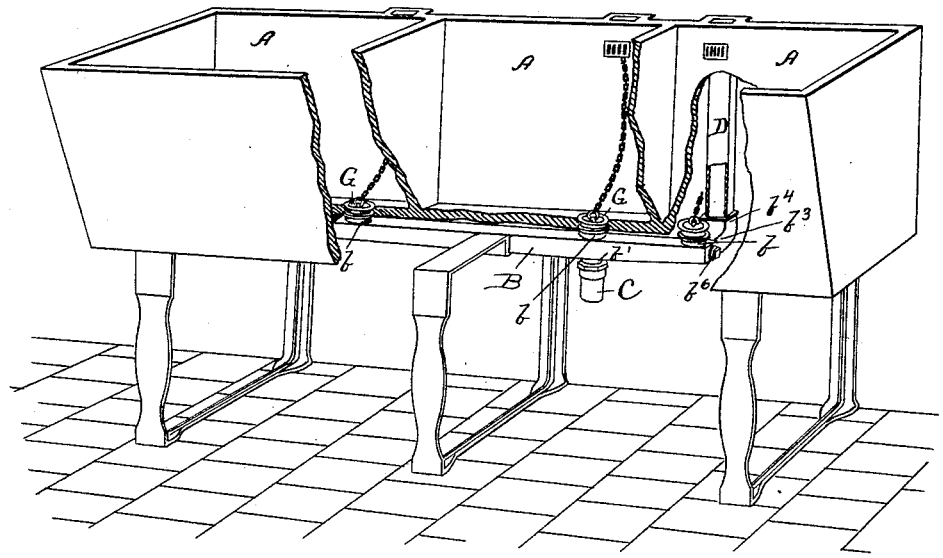
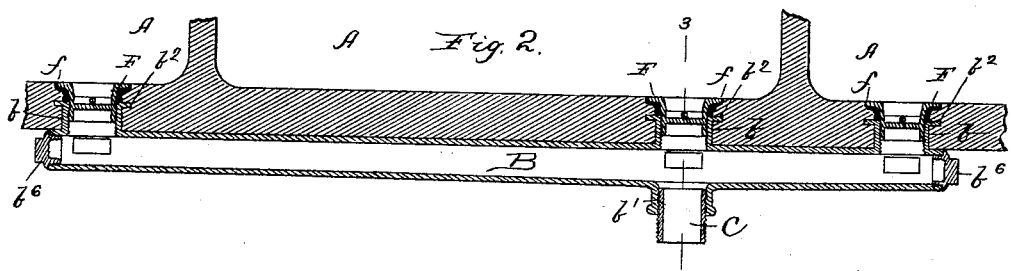
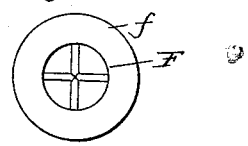
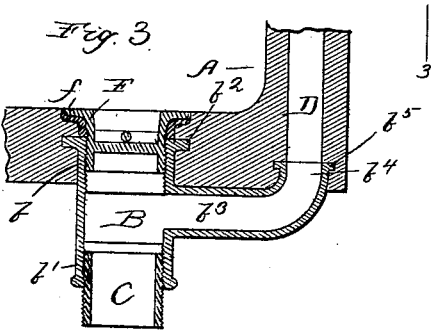
Witnesses:
Inventors:
John Clifford
John H. Gavin
By Munday, Evarts & Adcock
their Attorneys.

UNITED STATES PATENT OFFICE.

JOHN CLIFFORD AND JOHN H. GAVIN, OF CHICAGO, ILLINOIS, ASSIGNORS TO THE L. WOLFF MANUFACTURING COMPANY, OF SAME PLACE.

WASTE AND OVERFLOW CONNECTION FOR CEMENT LAUNDRY-TUBS.

SPECIFICATION forming part of Letters Patent No. 480,692, dated August 9, 1892.

Application filed September 5, 1891. Serial No. 404,897. (No model.)

*To all whom it may concern:*

Be it known that we, JOHN CLIFFORD and JOHN H. GAVIN, citizens of the United States, residing in Chicago, in the county of Cook and State of Illinois, have invented a new and useful Improvement in Waste and Overflow Connections for Cement Laundry-Tubs, Sinks, &c., of which the following is a specification.

Our invention relates to waste-pipe and overflow connections for cement washtubs or other like vessels.

In the accompanying drawings, which form a part of this specification, and in which similar letters of reference indicate like parts, Figure 1 is a perspective view of a set of three tubs embodying our invention. Fig. 2 is a longitudinal vertical section, and Fig. 3 is a vertical cross-section on line 3 3 of Fig. 2. Fig. 4 is a top or plan view of the brass socket forming the seat for the plug or stopper.

In the drawings, A A A represent a set of three washtubs made of cement or other composition adapted to be molded or cast.

B is the combined waste and overflow connection from each of the tubs to the single waste or drain pipe C. The connection B consists of a straight tube, preferably square or rectangular in cross-section, and cast with three outlets or tubular projections $b$ $b$ $b$ on its upper face, one for each of the tubs A, and with a single outlet or tubular projection $b'$ on its under face to connect with the waste-pipe C. The outlets or tubular projections $b$ are each furnished with collars or flanges $b^2$ to aid in securing the connection B to the tubs A and thus supporting the same. The connection-pipe B is further provided with hollow arms $b^3$, having turned-up ends or sockets $b^4$, to receive the overflow-pipes D, one for each tub. The hollow arms $b^3$ of the waste and overflow pipes B are also preferably provided with collars or flanges $b^5$ to aid in securing the pipe B to the tubs A when the same are molded or cast. The connection pipe B fits on the bottom of the tubs and outside the same, and is provided at its opposite ends with brass trap-screws $b^6$, so that by simply unscrewing these trap-screws the waste connection B may be rodded from end to end and any stoppage or obstruction therein thus readily removed without expense or the aid of a plumber and without danger of injuring the tubs or disturbing their waste connections.

The outlet-bushings or tubular projections $b$ of the waste connection B are provided with internal screw-threads to receive the threaded brass socket F, which constitutes the seat for the stopper or plug G. The brass sockets F are furnished with collars or exterior flanges $f$, which overlap the cement at the outlet-openings of the tubs, and thus aid in uniting the pipe B to the tubs A rigidly and firmly, while at the same time, the brass F being firmly screwed to the casting B, the former is held firmly in place and all danger of its being loosened or disturbed when forcibly setting in or withdrawing the stopper is prevented. The lateral arms $b^3$ of the pipe connection B, which connect with the overflows D and the upturned ends of which are embedded in the cement, also materially aid in firmly uniting the waste-pipe connection B to the tubs A, while at the same time we are enabled to keep said connection B entirely outside or exterior to the tubs, so that it may be rodded from end to end through the screw-plugs $b^6$. The bushing or tubular outlet projection $b'$ is screw-threaded to receive the waste-pipe C.

We make the waste-pipe connection B preferably slightly tapering from each end toward the outlet $b'$, as this tends to prevent stoppage or clogging, and it also facilitates the discharge when all the tubs are being emptied at once.

Of course it will be understood that the cement or composition tubs A are cast or molded to or about the waste connection or pipe B.

By providing the set of three tubs with the single waste connection pipe B, made in one piece and furnished with hollow arms or tubular sockets $b^3$, cast integral therewith, to receive the overflow-pipe D, and by providing this single waste connection B, with which the outlets of all three of the tubs communicate, with a single outlet or connection to the waste-pipe C the work of setting up the tubs is much simplified and cheapened, while at the same time the construction of the tubs themselves and their waste connections is also simplified.

The invention may be used with a less or greater number of tubs or vessels in a set than three.

We claim—

1. The combination, with a common waste connection B, of a set of tubs or vessels A, cast upon or about said waste connection, said waste connection being a straight pipe secured on the outside of said tubs at the bottom thereof, having outlets connecting with each of said tubs and a single outlet connecting with the waste or drain pipe, and being provided at each end with a removable screw-threaded plug or trap, so that said waste connection may be rodded from end to end, substantially as specified.

2. The combination, with a set of tubs or vessels A, of a common waste connection B, secured exteriorly thereto along the bottom of the same and provided with integral tubular outlets $b$, one for each tub, having collars or flanges $b^2$, said tubs being molded or cast around said tubular projections or bushings $b$ to secure said waste connection in place, substantially as specified.

3. The combination, with a set of cement tubs A, of a common exterior waste connection B, having tubular outlets $b$, one for each tub, on its upper side and a single waste-pipe-connection outlet $b'$ on its under side, said waste connection B being also provided with hollow arms $b^3$, cast integral therewith, to receive the overflow-pipes D, said tubular outlets $b$ having collars $b^2$ and said waste connection B having trap-screws $b^6$, one at each end, substantially as specified.

4. The combination, with a set of cement or composition washtubs or vessels A, of a common waste connection B, secured to the bottom or under side of the tubs upon the outside thereof and provided with a flat upper side fitting directly against the bottom or under side of the tubs, said tubs being molded or cast to or about said waste connection and the waste connection being furnished with tubular projections or bushings, one connecting with and constituting the outlet for each of said tubs, substantially as specified.

JOHN CLIFFORD.
JOHN H. GAVIN.

Witnesses:
H. M. MUNDAY,
EDWARD ADCOCK.